United States Patent
Kang et al.

(10) Patent No.: US 7,177,600 B2
(45) Date of Patent: Feb. 13, 2007

(54) APPARATUS AND METHOD FOR TESTING PERFORMANCE OF MOBILE STATION HAVING GPS FUNCTION

(75) Inventors: Do-Woo Kang, Gunpo-si (KR); Hun-Taek Han, Seoul (KR); Hyong-won Kim, Gwangmyeong-si (KR); Tae-Sook Yoon, Incheon (KR)

(73) Assignee: LG Electronics Inc., Seoul (KR)

( * ) Notice: Subject to any disclaimer, the term of this patent is extended or adjusted under 35 U.S.C. 154(b) by 610 days.

(21) Appl. No.: 10/601,571

(22) Filed: Jun. 24, 2003

(65) Prior Publication Data

US 2004/0093135 A1    May 13, 2004

(30) Foreign Application Priority Data

Jun. 26, 2002    (KR)    ...................... 10-2002-0036002

(51) Int. Cl.
*H04B 17/00*    (2006.01)

(52) U.S. Cl. ................................ 455/67.11; 455/67.14; 455/423; 455/424; 455/456.1; 455/435.1; 455/422.1; 455/434; 370/335; 370/311; 370/342; 375/227

(58) Field of Classification Search ............. 455/67.11, 455/456.1, 67.14, 423, 424, 435.1, 422.1, 455/434; 370/335, 331, 342; 375/227
See application file for complete search history.

(56) References Cited

U.S. PATENT DOCUMENTS

| | | | |
|---|---|---|---|
| 5,754,560 A * | 5/1998 | Nousiainen et al. | 714/716 |
| 5,945,949 A * | 8/1999 | Yun | 342/457 |
| 6,208,841 B1 * | 3/2001 | Wallace et al. | 455/67.12 |
| 6,285,876 B1 * | 9/2001 | Zhong | 455/424 |
| 6,347,227 B1 * | 2/2002 | Johansson | 455/456.1 |
| 6,560,442 B1 * | 5/2003 | Yost et al. | 455/423 |
| 6,567,381 B1 * | 5/2003 | Jeon et al. | 370/252 |
| 6,671,265 B1 * | 12/2003 | Hwang et al. | 370/331 |
| 6,760,582 B2 * | 7/2004 | Gaal | 455/423 |
| 6,904,282 B2 * | 6/2005 | Cooper | 455/434 |
| 6,970,708 B1 * | 11/2005 | Raith | 455/440 |

FOREIGN PATENT DOCUMENTS

JP    2000-286999    10/2000

* cited by examiner

*Primary Examiner*—Marceau Milord
(74) *Attorney, Agent, or Firm*—Fleshner & Kim, LLP

(57) ABSTRACT

Disclosed are an apparatus and method for testing performance of a mobile station having a global positioning system (GPS) mounted therein. The method provides for virtually changing parameters required for a registration at a base station so that the mobile station excludes the registration and directly enters a test state with an idle mode, and testing the performance of the mobile station in the idle mode test state. Accordingly, no re-boot is necessary to register with the base station upon completion of the test.

26 Claims, 2 Drawing Sheets

APPARATUS AND METHOD FOR TESTING PERFORMANCE OF MOBILE STATION HAVING GPS FUNCTION

BACKGROUND OF THE INVENTION

1. Field of the Invention

The present invention relates to a mobile communication system, and more particularly to an apparatus and method for testing performance of a mobile station having a global positioning system (GPS) mounted therein.

2. Background of the Related Art

Currently, there has been a great growth in the development and application in the field of information communication related techniques using a mobile station. In particular, the field of mobile stations having a position information collection system using a satellite communication, such as GPS, has been of increasing interest.

The "gpsOne" technology of Qualcomm Company is for tracking the position of a code division multiple access (CDMA) mobile station having the gpsOne function mounted therein. Tracking is done by a hybrid technique having a combination of functions of the GPS and a network based location termination technology. Thus, the GPS tracks the position of a GPS receiver on the ground by measuring the time required for a GPS satellite signal to reach the GPS receiver and the network based location determination technology tracks the position of the mobile station by measuring the time required for a CDMA base station signal to reach the mobile station.

According to the hybrid technique, a result of a GPS code phase lock is measured from a result of a CDMA code phase lock, and then transmitted to a position determination equipment (PDE). Thus, a resultant position of the corresponding mobile station, which is calculated by the PDE, is used to match a necessary application.

The related art technique has various problems. For example, the technical document CL93-V2244-1 (2002.3.14.) of Qualcomm Company does not propose an adequate test procedure, except for only a partial setting required for the idle mode test.

Also, according to the related art test procedure, values of non-volatile (NV) items (or parameters) stored in a mobile station under test (MSUT) are changed for the test procedure. For this change, the MSUT needs to be re-booted, thereby requiring additional time for re-booting.

That is, corresponding parameters are defined and stored in a non-volatile memory of the MSUT, and the MSUT attempts to register itself at a base station referring to the post-test parameters when the MSUT is booted.

Specifically, the parameters as defined above are called the NV items. Since most NV items are referred to in booting the MSUT, the re-booting of the MSUT is necessarily required for changing the NV items and then applying the changed NV item values for the post test operation of the MSUT.

Hence, according to the related art test system, the performance test may be performed in a state that the test equipment is shared by at least two MSUTs. An actual test procedure, however, has not been defined.

Also, in order for the values of the NV items of the MSUT to be changed for the related art test proceedings, the MSUT must be re-booted. This requires an additional re-booting time since the MSUT must be re-booted once during the test for mass production, a test time of several minutes is required for each MSUT. This deteriorates the test efficiency.

Also, no solution has been proposed to overcome the problems for the test proceedings that may be produced when the MSUT attempts to register itself at a base station referring to the NV items before the NV item values proceeding with simultaneous booting of several MSUTs are changed.

Especially, the related art test system cannot solve an impedance-mismatching problem that may be produced when an inferior MSUT is connected to a divider.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for testing performance of a mobile station.

Another object of the present invention is to provide an apparatus and method for testing a performance of a mobile station having a global positioning system (GPS) mounted therein.

Another object of the present invention is to provide an apparatus and method for testing a performance of a mobile station to apply a test at an idle mode of the mobile station to that of a mass production.

Another object of the present invention is to provide an apparatus and method for testing a performance of a mobile station such that the need for the mobile station to be re-booted is obviated.

Another object of the present invention is to provide an apparatus and method for testing a performance of a mobile station to prevent the impedance mismatch of a divider.

Another object of the present invention is to provide an apparatus and method for testing a performance of a mobile station that reduces the time required for entering a test mode of a mobile station.

To achieve at least these objects in whole or in parts, there is provided an apparatus for testing a performance of a mobile station under test (MSUT) having a global positioning system (GPS) function, including virtually changing parameters required for a registration at a base station so that the mobile station excludes the registration and directly enters a test state with an idle mode, and testing the performance of the mobile station in the idle mode test state.

To achieve at least the above objects, in whole or in parts, there is further provided a method of testing performance of a mobile station, including excluding a registration of the mobile station at a base station by changing parameters loaded referring to non-volatile items required for the registration, entering a test state with an idle mode, and testing the performance of the mobile station in the idle mode test state.

To achieve at least the above objects, in whole or in parts, there is further provided a method of testing performance of mobile stations having global positioning system function, including excluding a registration of the mobile stations at a base station by changing parameters loaded referring to non-volatile items required for the respective registrations, entering a test state with an idle mode, testing the performance of the mobile station at the idle mode test state, and if a test result in the idle mode test state is "fail," further independently testing the performance of each mobile station.

To achieve at least the above objects, in whole or in parts, there is further provided a method of testing performance of mobile stations having global positioning system function, including turning off a power of a base station signal used for testing the performance, turning on signal paths from a divider to the mobile stations, connecting the mobile stations to a diagnostic monitoring means, excluding a registration of the connected mobile stations at a base station by changing parameters loaded referring to non-volatile items required for the respective registrations, entering a test state with an idle mode, turning on the power of the base station signal, and testing the performance of the mobile stations in the idle mode test state.

To achieve at least the above objects, in whole or in parts, there is further provided an apparatus of testing performance of a mobile station, including a tester for virtually changing parameters required for a registration at a base station so that the mobile station excludes the registration and directly enters a test state with an idle mode and testing the performance of the mobile station in the idle mode test state.

To achieve at least the above objects, in whole or in parts, there is further provided an apparatus of testing performance of a mobile station, including a tester for excluding a registration of the mobile station at a base station by changing parameters loaded referring to non-volatile items required for the registration and testing the performance of the mobile station in the idle mode test state.

To achieve at least the above objects, in whole or in parts, there is further provided an apparatus for testing a performance of mobile stations having a global positioning system (GPS) function, including a divider, having n paths, for turning on the n paths one by one if a fail for an idle mode test result of any mobile station occurs, and a diagnostic monitoring means for monitoring and processing the idle mode test results, and controlling to intercept a registration of the mobile stations in a base station by changing parameters loaded with reference to non-volatile items required for the respective registrations during booting of the mobile stations.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
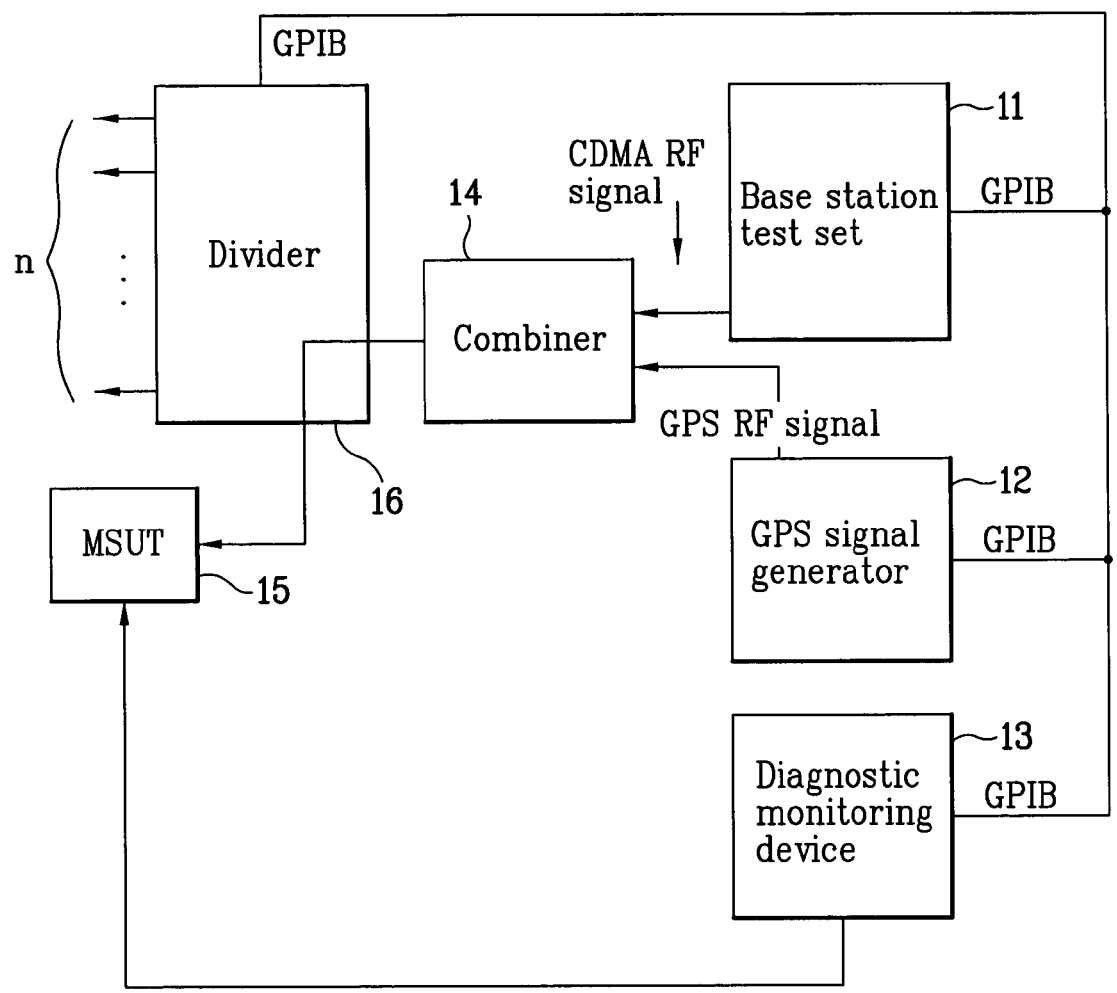
FIG. 1 is a drawing illustrating the construction of an apparatus for testing a mobile station having a GPS mounted therein according to a preferred embodiment of the present invention.

FIG. 1 is a drawing illustrating the construction of an apparatus for testing a mobile station having a GPS mounted thereon according to a preferred embodiment of the present invention.

Referring to FIG. 1, in an idle mode test for testing the performance of a mobile station having global positioning system, it is assumed that a traffic channel has not been established between an MSUT 15 and a base station test set 11. It is further assumed that the MSUT 15 is in an idle mode.

When the MSUT 15 is booted, the MSUT 15 attempts to register itself at a base station test set 11 referring to NV items values stored therein. At this time, a diagnostic monitoring device 13 does not intercept the attempt by changing the NV item values, but instead removes a main cause of re-booting of the MSUT 15 by changing parameters loaded at corresponding addresses of a memory with reference to NV item values during a booting operation of the MSUT 15. In other words, the diagnostic monitoring device 13 does not substantially change the NV item values, but virtually changes the NV items such that the MSUT 15 does not refer to the NV item values. This prevents the MSUT 15 from registering itself at the base station test set 11.

This technique solves the problem of multiple changes of NV item values. For example, if the NV item values were changed so that the MSUT 15 is prevented from registering the MSUT 15 at the base station test set 11, the NV item values would have to be changed again so that the mobile station may be registered at a base station in a commercial network after a procedure of the performance test is completed.

The test apparatus, as shown in FIG. 1, preferably includes a GPS signal generator 12 for generating GPS RF signals of a single channel, the base station test set 11 for generating CDMA RF signals, and a combiner 14 for combining the GPS RF signals and the CDMA RF signals. It further includes a divider 16 for diving paths of combined signals of the GPS RF signals and the CDMA RF signals under control of the diagnostic monitoring device 13. The diagnostic monitoring device 13 preferably includes diagnostic monitoring software, and takes charge of a control of the MSUT 15 and test equipment required for the test proceedings, virtually changes the NV items, and monitors and processes a test result. The test apparatus may also include a frequency counter (or oscilloscope, not shown), RF shield boxes as many as the number of MSUTs 15 (not shown), and cables (not shown) for connecting the respective blocks. At least one MSUT 15 should also be provided.

In operation, the base station test set 11 generates a CDMA signal required for locking a CDMA code phase of the base station in order to lock a GPS code phase to enable the MSUT 15 to receive the GPS signal.

The divider 16 divides combined signals of the CDMA RF signals and GPS RF signals into a plurality of paths. The diagnostic monitoring device 13 controls the number of divided paths and whether a portion of the combined signals are divided to any paths. The control by the diagnostic monitoring device 13 is preferably accomplished through a general purpose interface bus (GPIB) (which is a protocol relating to a remote control of the test equipment prescribed in IEEE-488) or other control paths.

The diagnostic monitoring device 13 further performs a performance test after controlling a prescribed number (n) of MSUTs to be connected with the divider 16 and booted in a state that a sector power of the base station set 11 is in an off state. At this time, the diagnostic monitoring device 13 sets the MSUT 15 so that the MSUT 15 searches one CDMA channel by correcting parameters loaded at corresponding addresses of a memory mounted therein, wherein the parameters are transferred to the diagnostic monitoring device 13.

The diagnostic monitoring device 13 also performs a performance test of all MSUTs 15 by turning on the sector power of the base station test set 11. If a fail of the performance test is produced, the diagnostic monitoring device 13 controls the respective MSUTs to be tested individually. That is, the diagnostic monitoring device 13 performs an individual performance test of each MSUT 15 by turning on the paths divided by the divider 16 one by one.

The idle mode test is performed on a precondition that MSUT 15 does not attempt the registration in the base station.

If, however, the MSUT 15 is in a CDMA idle state, then after the MSUT 15 is booted, but before the diagnostic monitoring devices 13 corrects the parameters loaded at corresponding addresses of a memory referring to the NV items related to the registration of the MSUT 15, the MSUT 15 may attempt to register itself at a base station test set 11.

Thus in the performance test of MSUT 15 at a mass production stage, a plurality of MSUTs are booted with time differences, and there exist probable differences among booting speeds. Also, since there exists a time gap from when the first booted MSUT enters a CDMA idle state to when the last booted MSUT enters a CDMA idle state, it is possible that at least one MSUT will attempt to register itself at a base station test set 11 during the time gap.

For example, if a memory address value is changed by the diagnostic monitoring device 13 while the MSUT 15 is referring to the memory address at which the NV item values are loaded so that the MSUT 15 can attempt to register itself at a base station test set 11, or if the MSUT 15 receives a start command of an idle mode test from the diagnostic monitoring device 13 while the MSUT 15 is operating a transmitter and/or a receiver for the registration, it is difficult to estimate the performance condition of the MSUT 15 and to perform a performance test.

This means that the idle mode test wills not be properly performed if the diagnostic monitoring device 13 does not prevent the MSUT 15 from attempting to register itself at a base station test set 11. According to a preferred embodiment of the present invention, an idle mode test method is provided that removes such an error generation.

Figure 2:
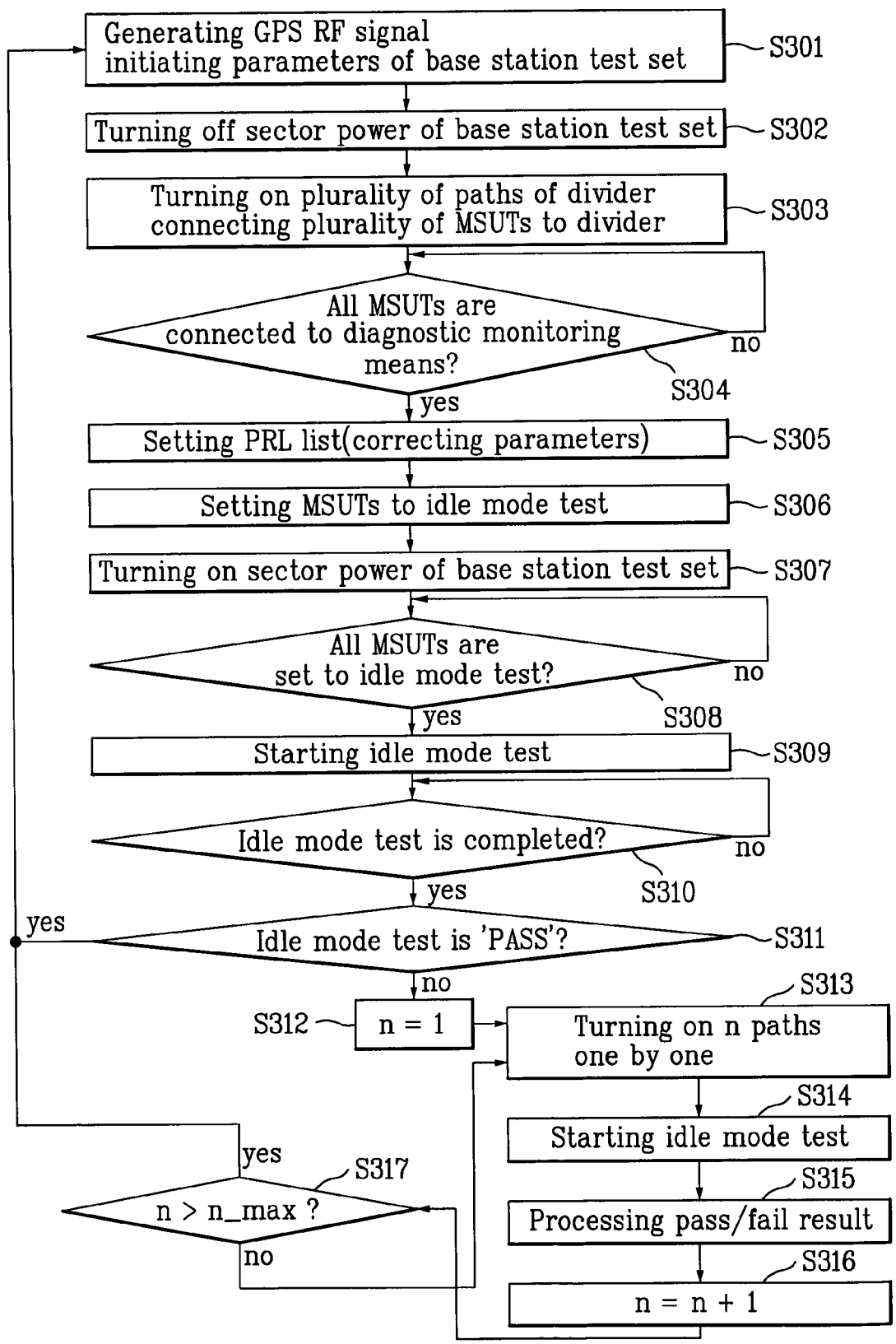
FIG. 2 is a flowchart illustrating a method of testing performance of a mobile station having a GPS according to a preferred embodiment of the present invention.

Hereinafter, the method of testing the performance of a mobile station according to a preferred embodiment of the present invention will be described. FIG. 2 is a flowchart illustrating the method of testing the performance of a mobile station having a GPS according to a preferred embodiment of the present invention.

Referring to FIG. 2, in order to proceed with the idle mode test of the MSUT 15, the GPS signal generator 12 preferably generates a GPS signal (preferably a GPS RF signal) under a specified condition, and the base station test set 11 initializes necessary parameters (step S301). At this time, the divider 14 turns on all the n divided paths.

Next, the base station test set 11 turns off the sector power (step S302). The divider 14 then makes a connection with the n MSUTs, and the n MSUTs are booted (step S303). The diagnostic monitoring device 13 then waits until all the n MSUTs are connected thereto (step S304).

Herein, the term "sector power" indicates a strength of the CDMA base station RF signal, and "sector power-off" indicates that the mobile station under the idle mode test enters a CDMA idle state. In this idle state, the mobile station does not attempt to register itself at a base station test set 11.

In order to reduce the time required to enter the CDMA idle state, after all the n MSUTs are connected to the diagnostic monitoring device 13, the PRL list of a MSUT is set in a manner that the NV items are not changed (step S305). Instead, only parameters transferred to the diagnostic monitoring device 13 by software are changed so that the MSUT 15 searches for one CDMA channel. In other words, the diagnostic monitoring device 13 removes a primary reason for re-booting of the MSUT 15 by changing parameters loaded at corresponding addresses of a memory with reference to NV item values.

After performing the above setup operation, the diagnostic monitoring device 13 controls the MSUT 15 such that the MSUT 15 is set to the idle mode test, and so that the MSUT 15, after the MSUT 15 enters the CDMA idle state, does not attempt to register itself at the base station test set 11 (step S306).

Accordingly, after the sector power of the base station test set 11 is turned on (step S307), the MSUT 15 does not perform the registration process. This reduces the time required for entering the idle mode test.

After the sector power of the base station test set 11 is turned on, the diagnostic monitoring device 13 monitors whether or not all the n MSUTs are in the CDMA idle state (step S308).

If it is determined that all of the n MSUTs are in the CDMA idle state as a result of monitoring, the idle mode performance test is simultaneously performed with respect to the n MSUTs (step S309).

When it is determined that the idle mode test as described above is completed (step S310), it is judged whether the test result is "PASS" (step S311).

If a test result of all the MSUTs are determined to be "PASS," the next test is performed, while if a test result of any MSUT is a "FAIL," the n paths divided by the divider 16 are turned on one by one (steps S312 and S313) to perform the individual test with respect to each individual MSUT.

The individual test includes an idle mode test start (step S314) and a pass/fail result processing (step S315). Then, the n value is increased by 1 (step S316), until it is determined that the increased n value is the maximum value (step S317).

Through the individual test as above, it may be determined which MSUT is having a problem or causing an error. The reason why the individual test is necessary is as follows. If the GPS path of one MSUT among the n MSUTs is inferior and the GPS path's impedance value deviates from 50 Ω, the mismatching of the impedance will affect other MSUTs that share the GPS RF signal through the divider 16. The impedance mismatch thus disturbs the test performance of other MSUTs.

That is, since test results of several MSUTs are simultaneously determined to be "FAIL" if the above-described problem is produced, the problematic MSUT should be identified by testing the performance of each corresponding MSUT after turning on the signal paths of the divider 16 one by one.

As described above, the apparatus and method for testing the performance of the mobile station having the GPS function according to a preferred embodiment of the present invention has many advantages.

For example, it may solve the problems that may occur when the idle mode test, which is only theoretically proposed in the related art technology, is applied to the actual test.

Next, during the booting of the MSUT, the system and method of the preferred embodiment can prevent the failure of the test that may occur when the registration with the CDMA base station test set is unnecessarily performed.

Additionally, the system and method of the preferred embodiment do not directly change the related NV item settings in the idle mode test of the MSUT, but changes only the parameters transferred by software to operate the MSUT in the idle mode, so that the re-booting for the effective NV item settings is not required. This requires no resetting of the NV items for performing the off operation of the idle mode required during the delivery of the MSUT, and thus the time required for the test can be reduced.

Moreover, when any problematic MSUT exists among the plurality of MSUTs, an individual test is performed that prevents the impedance mismatch of the corresponding MSUT affects the power divider. This can suppress the effect in that the inferior MSUT deteriorates the test performance of other MSUTs.

The foregoing embodiments and advantages are merely exemplary and axe not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of testing performance of a mobile station, comprising:
    virtually changing parameters of a mobile station required for a registration at a base station so that the mobile station excludes the base station registration and directly enters a test state in an idle mode; and
    testing a performance of the mobile station in the idle mode test state.

2. The method of claim 1, wherein the mobile station can register with the base station subsequent to the testing without rebooting.

3. The method of claim 1, wherein the mobile station comprises one of a plurality of mobile stations, wherein each of the plurality mobile stations is tested individually to determine an impedance mismatch between mobile stations.

4. The method of claim 1, wherein the mobile station comprises a global positioning system (GPS), and wherein the parameters that are virtually changed relate to non-volatile (NV) memory items.

5. The method of claim 1, wherein virtually changing parameters of the mobile station comprises modifying a memory address value of a mobile station by a diagnostic monitoring device prior to the mobile station registering itself with the base station.

6. The method of claim 1, further comprising:
    preventing a registration of a mobile station at a base station by changing mobile station parameters loaded referring to non-volatile items required for the registration; and
    entering an idle-mode test state by the mobile station prior to testing the performance of the mobile station in the idle mode test state.

7. A method of testing performance of mobile stations having global positioning system function, comprising:
    preventing a registration of a plurality of mobile stations at a base station by changing mobile station parameters loaded in each said plurality of mobile stations referring to non-volatile items required for the respective base station registrations;
    entering an idle mode test state by each of the plurality of mobile stations;
    testing a performance of the plurality of mobile station at the idle mode test state; and
    if a test result in the idle mode test state is "fail," independently testing each mobile station of the plurality of mobile stations.

8. The method of claim 7, wherein the registration is prevented by virtually changing parameters of the mobile station required for registration.

9. The method of claim 7, wherein independently testing each mobile station comprises an idle mode test and a pass/fail processing test, and wherein the independent testing of each mobile station determines which of the plurality of mobile stations has an impedance mismatch.

10. A method of testing performance of mobile stations having a global positioning system function, comprising:
    turning off a power of a base station signal used to test a performance;
    turning on signal paths from a divider to each of a plurality of mobile stations;
    connecting each of the plurality of mobile stations to a diagnostic monitoring device;
    preventing a registration of the connected mobile stations with a base station by changing parameters loaded at each of the plurality of mobile stations referring to non-volatile items required for the respective registrations;
    entering an idle mode test state by each of the plurality of mobile stations;
    turning on the power of the base station signal; and
    testing a performance of the mobile stations in the idle mode test state.

11. The method of claim 10, wherein each of the plurality of mobile stations can register with the base station subsequent to the testing without rebooting.

12. The method of claim 10, further comprising independently testing the performance of each mobile station if a test result in the idle mode test state is "fail."

13. An apparatus for testing a performance of a mobile station, comprising:
    a diagnostic monitoring device configured to virtually change parameters of a mobile station required for a registration at a base station to prevent the mobile station from registering with the base station and cause the mobile station to directly enter an idle mode test state, and further configured to test the performance of the mobile station in the idle mode test state.

14. The device of claim 13, wherein the diagnostic monitoring device prevents the necessity of a mobile station reboot in order for the mobile station to register with the base station subsequent to the test by not changing the non-volatile memory of the mobile station.

15. The apparatus of claim 13, further comprising:
    at least one generator to generate a global positioning system signal and a base station signal used to test the performance;
    a combiner to output a combined signal of the global positioning system signal and the base station signal; and a divider to receive and divide the combined signal into a plurality of divided signals for each of a plurality of mobile stations under control of the monitoring device.

16. The apparatus of claim 15, wherein the diagnostic monitoring device is configured to independently test the performance of each mobile station by controlling the signal paths if a test result in the idle mode test state is "fail."

17. An apparatus for testing a performance of a mobile station, comprising:
- a diagnostic test circuit configured to prevent a registration of a plurality of mobile stations at a base station by changing mobile station parameters loaded in each said plurality of mobile stations referring to non-volatile items required for the registration, and further configured to test a performance of the plurality of mobile stations in the idle mode test state.

18. The device of claim 17, the diagnosis test circuit prevents each of the plurality of mobile stations from requiring a reboot in order to register with the base station subsequent to the test.

19. The apparatus of claim 17, further comprising:
- at least one generator configured to generate a global positioning system signal and a base station signal used for testing the performance;
- a combiner configured to output a combined signal of the global positioning system signal and the base station signal; and
- a divider configured to divide the combined signals for each of the plurality of mobile stations under control of the diagnostic test circuit.

20. The apparatus of claim 19, wherein the diagnostic test circuit is further configured to independently test the performance of each mobile station by controlling signal paths from the divider if a test result of the plurality of mobile stations in the idle mode test state is "fail."

21. An apparatus for testing a performance of mobile stations having a global positioning system (GPS) function, comprising:
- a divider having a prescribed number of paths, and configured to individually turn on each of the paths one by one if a fail for an idle mode test result of any mobile station occurs during an idle mode test of a plurality of mobile stations; and
- a diagnostic monitoring circuit configured to monitor and process the idle mode test results, and to intercept a registration of each of the mobile stations with a base station by changing parameters loaded with reference to non-volatile items at each mobile station, the parameters being required for the respective registrations during booting of each mobile station.

22. The apparatus of claim 21, wherein the diagnostic monitoring circuit controls each of the mobile stations connected thereto to be booted in a state that a power of a base station signal is in an off state.

23. The apparatus of claim 22, wherein the diagnostic monitoring circuit prevents the necessity of a mobile station reboot by each of the mobile stations in order for the respective mobile station to register with the base station subsequent to the test.

24. The apparatus of claim 22, wherein the diagnostic monitoring circuit changes mobile station parameters so that each connected mobile station searches one CDMA channel, respectively.

25. The apparatus of claim 24, wherein non-volatile memory items of each mobile station are not changed.

26. The apparatus of claim 22, wherein the diagnostic monitoring circuit performs the performance test of each connected mobile station in a state that the power of the base station signal is in an on state.

* * * * *